United States Patent [19]
Chen et al.

[11] Patent Number: 5,695,005
[45] Date of Patent: Dec. 9, 1997

[54] FLUID DYNAMIC CROSSFLOW COOLING TOWER

[76] Inventors: Chia-Hsien Chen, 3 Fl., No. 3, Alley 16, Lane 235, Pao-Chiao Rd., Hsin Tien City, Taipei Hsien; Chiang Lai Chu, 4th Fl., No. 115, Sec. 1, Tung Ho E. St. Shih Lin District, Taipei, both of Taiwan

[21] Appl. No.: 580,463

[22] Filed: Dec. 28, 1995

[51] Int. Cl.⁶ .................. F28B 1/02; F28B 1/06
[52] U.S. Cl. .............. 165/110; 165/900; 261/DIG. 11; 261/153
[58] Field of Search .................. 165/110, 900, 165/DIG. 182, DIG. 300; 261/111, 116, 152, 153, DIG. 11, DIG. 77

[56] References Cited

U.S. PATENT DOCUMENTS

| | | | |
|---|---|---|---|
| 3,807,145 | 4/1974 | Engalitcheff, Jr. et al. | 261/DIG. 11 |
| 3,917,764 | 11/1975 | Phelps | 261/DIG. 11 |
| 3,929,435 | 12/1975 | Engalitcheff, Jr. | 261/DIG. 11 |
| 4,936,882 | 6/1990 | Chen et al. | 261/DIG. 11 |
| 5,490,392 | 2/1996 | Williams et al. | 261/153 |

*Primary Examiner*—Leonard R. Leo
*Attorney, Agent, or Firm*—The Kline Law Firm

[57] ABSTRACT

A fluid dynamic crossflow cooling tower has a tower body. In the upper portion of the tower body, there is a horizontally disposed injection tubular element which has a plural number of spaced nozzles disposed on the lateral side. Heated fluid is pumped into the injection tubular element and is ejected out through the nozzles and forms a continuous screen of high velocity liquid flow into a horizontal diffuser. Outside cooling air is drawn into the tower through the air inlet located the lower portion of the tower body. The cooling air then mixes with heated liquid in the diffuser to perform heat exchange process. The liquid and air mixture then pass through a mist eliminator which separates liquid from the air. The air is then discharged out of the tower body, liquid is cooled and falls into a water dispersing trough and then passes through a heat radiator for the second pass heat exchanging process, and finally drops into a water tray at the bottom of the tower body. This invention can be adapted for a small size one-way or a large size two-way type cooling tower.

1 Claim, 4 Drawing Sheets

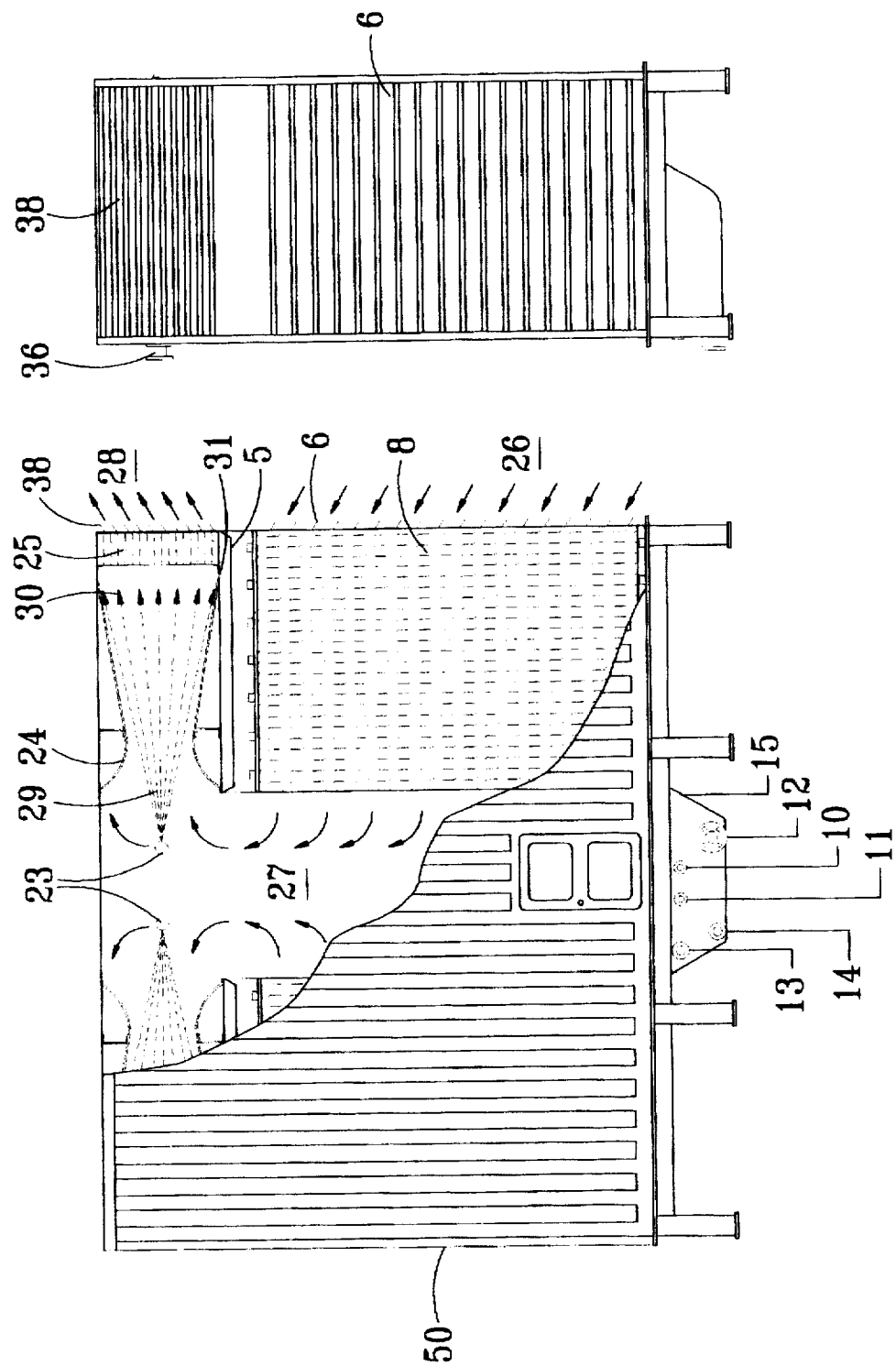

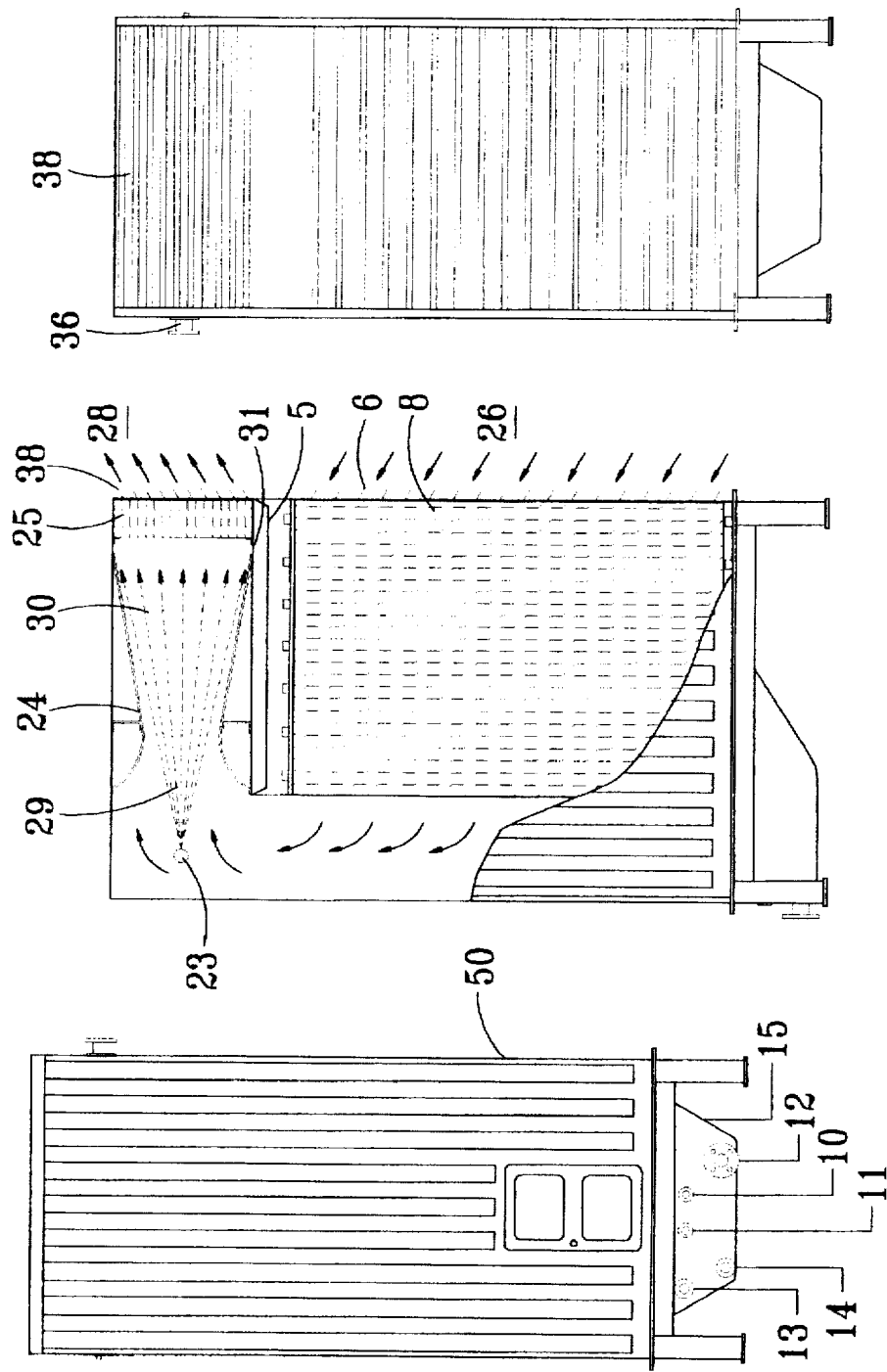

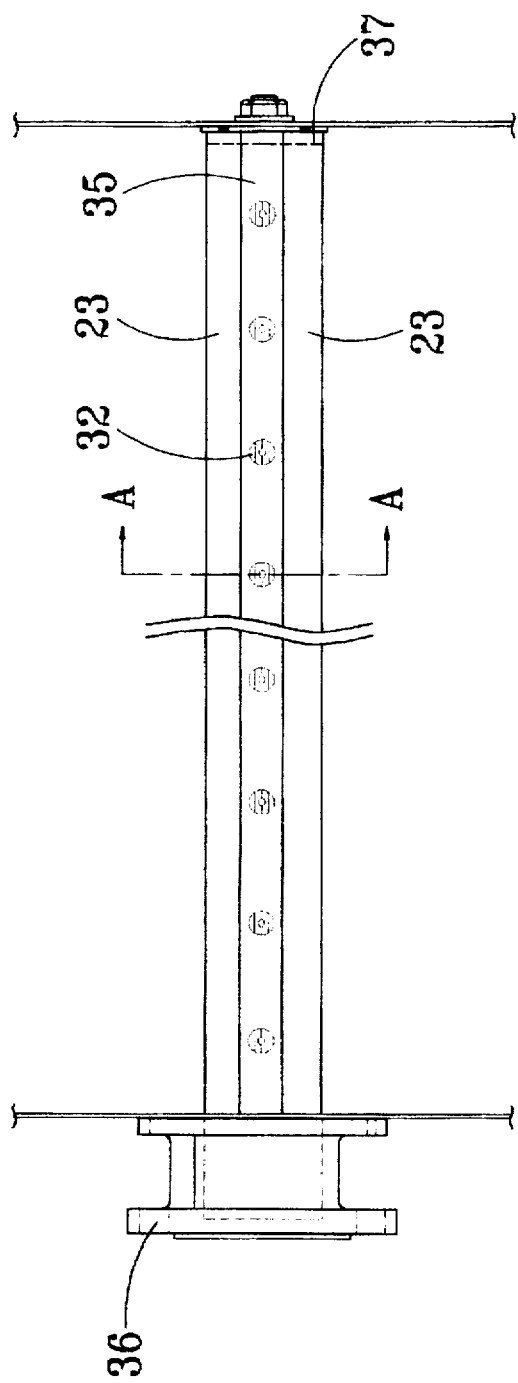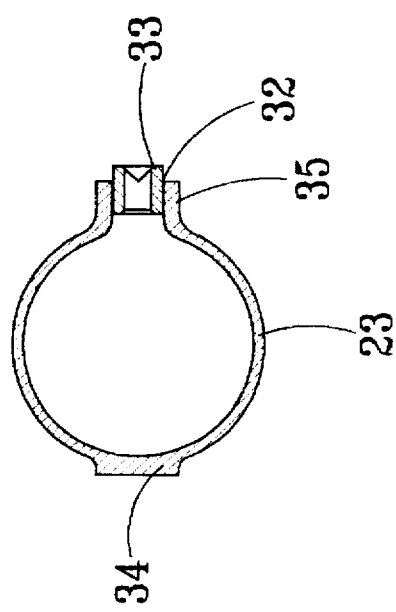

FLUID DYNAMIC CROSSFLOW COOLING TOWER

BACKGROUND OF THE INVENTION

1. Field of the Invention

The present invention relates to a cooling tower dispensed with motor and fan, and more particularly to a fluid dynamic crossflow cooling tower which has higher heat exchange efficiency and is more reliable and durable for industrial use.

2. Description of the Prior Art

The applicant has filed a patent regard a horizontal ejection cooling tower. It has heated and pressurized liquid supplied in an injection tubular element which has slot opening formed in radial direction. The pressurized heated liquid is then ejected out through the slot opening to form a continuous screen of high velocity liquid flow into a diffuser. The high velocity liquid flows into the diffuser and induces negative pressure at the front section and draws outside cooling air into the diffuser to perform heat exchange process between heated liquid flow and cooling air. At the rear section, the diffuser induces a higher pressure to enable the heated air flow, after heat exchange process, to discharge out rapidly. There is a deflector at the rear end of the diffuser to divert the horizontal mixed liquid flow upward. There is a mist eliminator to separate liquid from heated air. Liquid is falling down in a drip tray to be pumped for reuse, while heated air is discharged out into atmosphere.

The horizontal type structure set forth above takes relatively large space. The heat exchange efficiency of horizontally injection liquid is not very good. Only one pass cooling effect was attained. Heated air discharge outlet is small, thus reducing the discharge speed which in turn slow down the speed of inlet cooling air. Furthermore the diffuser and the injection tubular element are vertically disposed against the ground surface. It cannot be extended in upward direction. It can only be parallelly coupled together for large installation.

FIG. 1 illustrates a conventional large scale crossflow cooling tower. On the top, there is provided a motor 1, speed reducer 2, protecting grid 3, air flow barrel 4 and fan 20. All of them are huge size. For larger cooling capacity, the barrel becomes even higher, fan is longer, some over one meter in radius. It also needs a motor with bigger horsepower. It usually needs more than one set of cooling fan, could be four or six sets. Besides costing higher, it also has a heavy weight which needs very strong cooling tower structure to support all those equipments. Cooling fan 20 draws in outside cooling air through air inlet 6 and heat radiator 8. Heated water is firstly pumped into water tank 20 located on the top of the cooling tower, then flows via dispersing trough 5 into water channel 7 which embedded in the radiator 8 which is usually made of PVC radiation plate.

Therefore there is heat exchange process in the radiator 8 between the transversely flowing cooling air and the vertically flowing down heat water. At the bottom 16 of the cooling tower, there is provided a water tray 15 to collect the cooling water. Water tray 15 has a floatting switch 9, automatic water supply inlet 10, manual water supply inlet 11, water outlet 12, water overflow outlet 13, water discharge outlet 14, etc. Cooling tower generally is formed in rectangular shape with the radiator disposed in the wide lateral side while the narrow lateral side is closed by end plate 19. There is a door 18 on the end plate 19 to allow people to enter into the hall 17 within the cooling towr to perform maintenance or repair work. There is also a stair case 21 located on a side wall to enable people to climb up to the top of the tower to do repair or maintenance work. When there is mechanical or electrical disorder happen, repair and maintenance become a big problem. Therefore some property owner tries to invest and install a backup cooling tower to smooth out the possible emergency and to provide uninterrupt operation. It thus can be seen that conventional cooling tower has much room for improvement regarding the repair and maintenance, and also in how to reduce installation and operation costs.

SUMMARY OF THE INVENTION

It is an object of the present invention to provide a fluid dynamic crossflow cooling tower which is dispensed with cooling fan. It employs fluid kinetic energy and diffuser to draw in outside cooling air to perform heat exchange in the cooling tower. It has many advantages, including:

1. It can save space and can be expanded as needed, thus can be adapted flexibly and widely to different environments.
2. It has mist eliminator to separate fluid from air, thus can reduce fluid loss and save water supply and enhance sanitary condition.
3. It is simply and modularly structured. Can be flexibly assembled to form different cooling capacity to suit different requirements. It can be installed quickly and simply.
4. It does not need air flowbarrel, cooling fan, transmission belt, motor, speed reducer, etc. Therefore it greatly reduces installation and maintenance costs.
5. There is no operating noise of fan or other moving parts.
6. It consumes less electricty

BRIEF DESCRIPTION OF THE DRAWINGS

The drawings disclose the illustrative embodiments of the present invention which serve to exemplify the various advantages and objects hereof, and are as follows:

FIG. 2 is a front elevation view, partly cutaway, of an embodiment of a two-way cooling tower of the present invention.

FIG. 2A is a side elevation view of an embodiment shown in FIG. 2.

FIG. 3 is a front elevation view, partly cutaway, of an embodiment of a one-way cooling tower of the present invention.

FIG. 3A is a right side elevation view of an embodiment shown in FIG. 3.

FIG. 3B is a left side elevation view of an embodiment shown in FIG. 3.

FIG. 4 is a fragmentary side view of an injection tubular element of the present invention.

FIG. 5 is a sectionel view taken on line A—A of FIG. 4.

DETAILED DESCRIPTION OF THE PREFERRED EMBODIMENT

Figure 1:
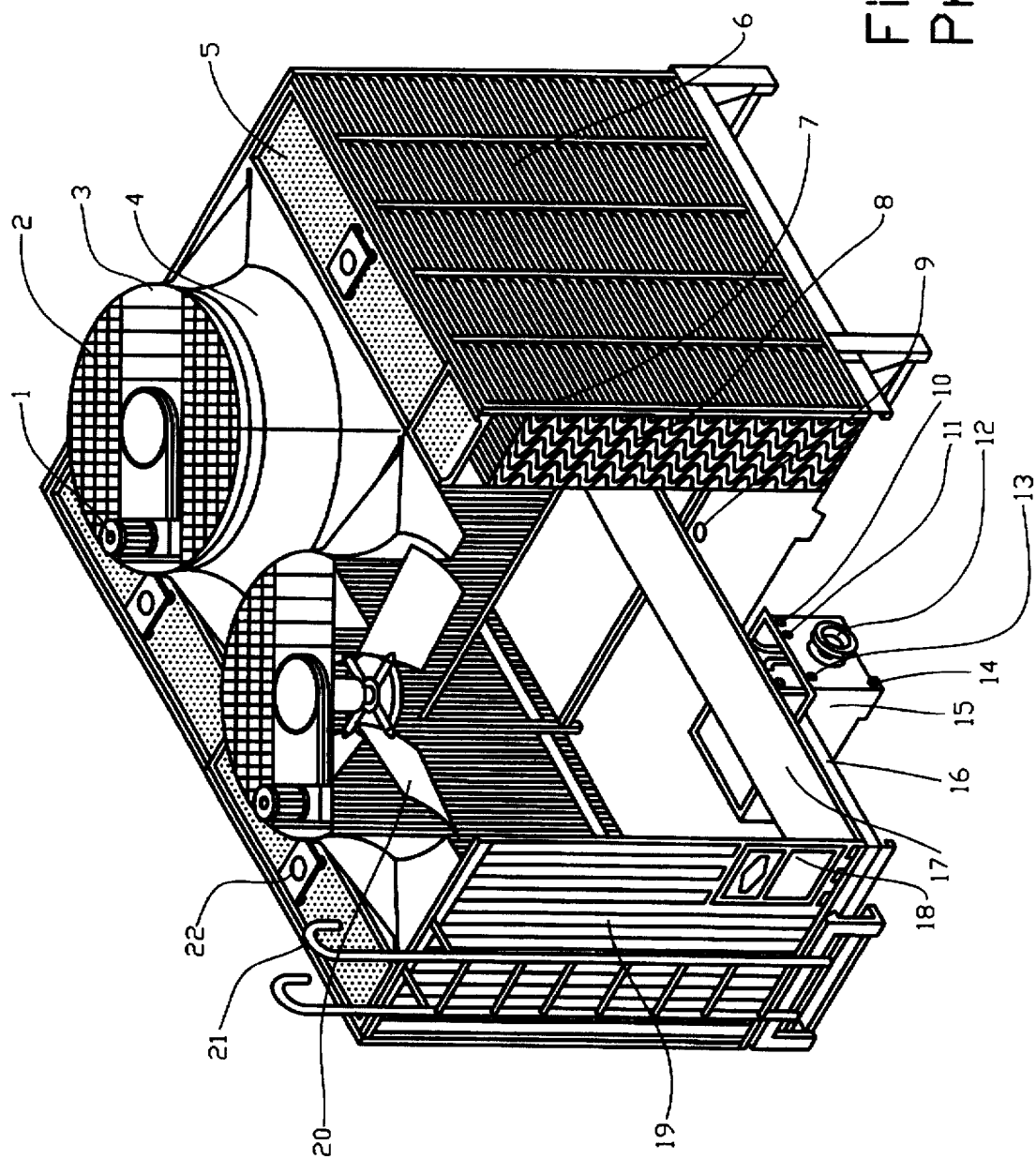
FIG. 1 is a perspctive view of a conventional crossflow cooling tower.

FIGS. 2 and 3 illustrate an embodiment of fluid dynamic crossflow cooling tower according to the present invention. Heated liquid flows into the cooling tower in different way comparing with a conventional cooling tower. At the upper portion in the middle section of tower body 50, there is a horizontal injection tubular element 23 to eject horizontally heated liquid 29 and to form a continous screen of high velocity liquid flow into the throat section of a diffuser 24. Then negative pressure is induced in the diffuser in front of the throat section. Thereby outside cooling air 26 is withdrawn into the tower through air inlet 6 and forming air flow 27 moving upward and then channel toward diffuser 24. The heated liquid flow 29 and cooling air are mixed with each other in the diffuser 24 and performing heat exchange function. The mixture of cooling liquid and warm-up air then pass through a mist eliminator 25 which separates liquid from air, the warm-up air 28 is then discharged out through air outlet located above the air inlet 6. The cooling liquid falls down into a water dispersing trough 5, passes through the heat radiator 8 for the second pass cooling process, then drops into water tray 15 to be pumped out through water outlet 12 for re-circulation use.

The present invention does not change the basic structure of a conventional cooling tower, only air flow barrel, motor, fan and speed reducer are omitted. Therefore it can be adapted to the existing cooling tower facility. The high cost mechnical and electrical equipments can be eliminated. Only a set of diffuser and mist eliminator need to be added and installed. These new addition of facilities are operated in static status. There is not moving parts, thus no noise or maintenance problem.

The present invention can apply equally well to large scale cooling tower as to medium or small size cooling tower, whether one-way or two-way type. In general, it is applicable to five cooling ton capacity or up. Since as many sets of injection tubular element, diffuser and mist eliminator can be added as required, there is not upper limit regard the cooling capacity when the present invention is employed.

FIG. 2 illustrates a two-way structure with two heat radiators disposed on two opposite sides. FIG. 3 illustrates a one-way structure. In the upper portion of one side of the tower body 50, there is a pair of diffusers 24 (for two-way structure) or a diffuser 24 one-way structure) horizontally disposed and open toward the lateral side. At the expanding end of the diffuser 24, there is a mist eliminator 25 and an air outlet and a deflector 38. The diffuser 24 is a curved plate symmetrically formed against a horizontal central plane. The diffuser 24 has a reducing section at the inner portion, a throat section in the middle and an expanding section at the outward portion. High velocity liquid flow, when passing through the throat section, converts liquid pressure at the nozzle into. Kinetic energy which causes the pressure to drop sharply, thus inducing negative pressure at the inner reducing section of the diffuser. Thereby a strong suction inlet is resulted to draw in outside cooling air into the cooling tower. The cooling air and the heated liquid then form a turbulent mixing at the throat section. The mixture of the cooling air and heated liquid then flow into the expanding section where heated liquid is cooling down, while cooling air is warm-up, and kinetic energy is transformed into pressure and a strong cooling effect is induced. The warm-up air is then discharged out of the cooling tower by means of pressure building in the expanding section of the diffuser. Therefore no air discharging fan or motor is needed.

Referring to FIGS. 4 and 5, beyond the inner section of the diffuser, there is provided a horizontal injection tubular element 23. Tubular element 23, on the surface facing toward the diffuser, has a protrusive flange 35 axially formed thereon, upon which a plural number of spaced openings 32 are formed. Each opening 32 has a V-shape nozzle 33 disposed therein to allow heated liquid 29 to enject out therethrough. Injection tubular element 23 has one opening end engaged with a flange 36 to allow heated liquid to flow into. Another end of tubular element is closed by a plug 37 and is fixed on the wall of the tower body. On another surface opposite to the protrusive flange 35, there is a protrusive ridge 34 formed to reinforce the strength of the injection tubular element. Brackets may also be used to support the injection tubular element when needed.

When the mixture 30 of heated liquid and cooling air passes through the mist eliminator 25 located at the outside end of the diffuser 24, liquid will be separated from the air. Air is then discharged out through air outlet and deflector 38. Mist eliminator 25 is formed by corrugated plate, thus able to reduce liquid loss down to 0.1% or less. Liquid, after separated by the mist eliminator, dropsdown by natural gravity force into an elongated trough 31 located below the diffuser 24 and mist eliminator 25, and then flows into the water dispersing trough 5 which allows liquid to evenly spread upon the heat radiator 8 to proceed another cooling process with the outside cooling air flowed therethrough.

A water tray 15 is located at the bottom of the cooling tower to collect the cooled liquid for re-use. Through the simplified structure set forth above, the present invention can be adapted to conventional cooling tower structure. It can expands the utilization of existing facilities and greatly reduces installation and operation costs.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A fluid dynamic cross flow cooling tower comprising:

a tower body including an air outlet located at an upper portion of a lateral wall, an air inlet located below said air outlet, a heat radiator made of a plurality of heat radiating plates located at a rear of said air inlet, a water dispersing trough located above said heat radiator and a water tray located below the heat radiator;

an injection tubular element being horizontally and parallelly disposed against the air inlet, wherein the injection tubular element on a radial surface facing toward the direction of said air outlet has a protrusive flange upon which a plural number of spaced openings are formed with each opening having a V-shape nozzle disposed therein to enable heated liquid to eject out horizontally only through the nozzle, and on the surface opposite to the nozzle there is a protrusive ridge formed thereon;

a diffuser located inside said tower body and above the water dispersing trough and outside of the injection tubular element, wherein the diffuser is formed by a pair of curved plates symmetrially disposed against a central plane, the injection tubular element and the nozzle opening are disposed substantally on the central plane, the diffuser has a reducing section at an inner end, a throat section in a middle portion and an expanding section at an outward end;

an elongated trough being disposed between the diffuser and the water dispersing trough; wherein the diffuser converts pressure of the heated liquid ejected out of the nozzle to kinetic energy and forms a continuous screen of high velocity liquid and gas mixing flow, and inducing negative pressure at a lower portion of the tower body to draw in outside cooling air for heat exchange with the heated liquid, the mixing flow of liquid and gas flows to said air outlet where liquid falls through the elongated trough to the water dispersing trough; and a mist eliminator located at the outward end of said diffuser and above said air inlet, including a plurality of corrugated plates for separating liquid from air, wherein the air being separated is discharged out through said air outlet and a deflector located outside of said air outlet, wherein the liquid being separated falls into the water dispersing trough through the elongated trough.

* * * * *